April 14, 1936.   A. F. JACKSON   2,037,027
LIGHTER
Filed April 3, 1929   2 Sheets-Sheet 1
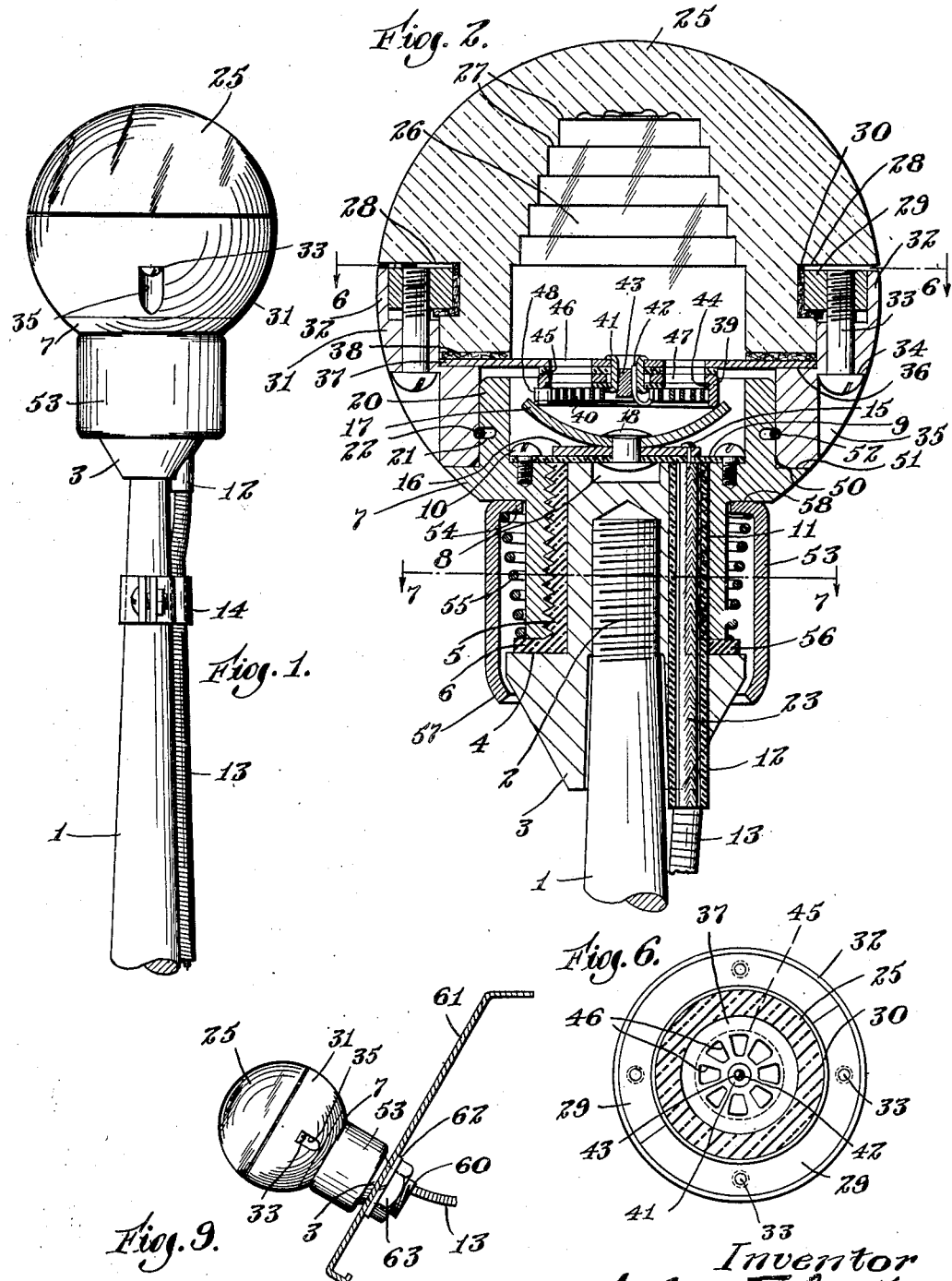

April 14, 1936.   A. F. JACKSON   2,037,027
LIGHTER
Filed April 3, 1929   2 Sheets-Sheet 2

Inventor
Alfred F. Jackson
by James R. Hodder
Attorney

Patented Apr. 14, 1936

2,037,027

UNITED STATES PATENT OFFICE 2,037,027

LIGHTER

Alfred F. Jackson, Attleboro, Mass., assignor to Apco Mossberg Corporation, Attleboro, Mass., a corporation of Massachusetts; Lewis R. Smith, Attleboro, Mass., receiver of said Apco Mossberg Corporation Application April 3, 1929, Serial No. 352,178

5 Claims. (Cl. 219—32)

The present invention relates to lighters, and more particularly to a novel and improved cigar or cigarette lighter adapted and intended for installation in and application to an automobile.

Present automobile cigar lighters are attached to the dash board or steering column, which are awkward locations for the operator of the automobile to reach, particularly while driving the car. These prior cigar lighters comprise two types, one with a cord affixed to the lighting element, and the other with a separable lighting element. In each instance, however, the element is exposed, and is also faced toward the operator, resulting in the necessity of reversing the lighter in the hand of the operator when it is desired to light a cigar or cigarette. This further increases the inconvenience and disadvantage of these prior lighters and in fact constitutes a real menace while driving an automobile, as the operator is unable to give his entire attention to the road. A further disadvantage of existing types of lighters is that the lighting element or resistance unit being exposed, will be a repository for dust, dirt, and other foreign matter, hindering and obstructing the proper operation and functioning of the lighter. Another difficulty and danger with existing lighters is the possibility of the operator burning himself on the heated element.

An important object of the present invention, therefore, is the provision of a lighter in which the lighting element will at all times be protected, except when removed for lighting purposes.

A further and important object of the invention resides in the provision of a lighter, so constructed and arranged that, when grasped by an operator, it will be in a natural and normal position for effecting the lighting of a cigar or cigarette, without the necessity of reversing the element in the hand of the operator, thus enabling the operator to devote his attention entirely to the road and to the operation of the automobile.

Another object of the invention is the provision of a lighter in which means is provided to apprise the operator when the lighting element has reached the proper degree of heat. This important feature is accomplished by means of an ornamental translucent cap or cover, the lighting element and the mountings therefor being so constructed and arranged that light from the element, even though said element is faced away from the operator, will be diffused through said translucent cover. The word translucent is intended also to cover transparent material, such as glass, the two terms translucent and transparent being used interchangeably herein.

Another feature of the invention resides in the provision of a simply operated switch, remote from the element itself, which will permit an instantaneous, universal contact. This switch is spring controlled so that it will automatically be returned to normal position after each operation without any attention from the operator.

A still further feature of the invention resides in the ease and facility of operation of my novel lighter.

Another object of the invention resides in locating the lighter on the top of the gear shift lever, where it will be readily accessible to the operator without taking his eyes off of the road. The lighter is substantially spherical and takes the place of the usual gear shift lever ball or knob, thus serving the dual function of a ball or knob, and of a lighter. The advantages of this last described feature will be instantly apparent to those skilled in the art, as well as to operators of automobiles.

Another object of the invention resides in the provision of spring means to retain the cover and its element in position on the fixed portion of the lighter, said cover being so located with respect to said fixed portion that proper contact between the element and a current conducting member in the fixed portion will be assured.

While I have illustrated my invention as utilized in combination with the gear shift lever, it will be appreciated that I am not limited thereto, and that the same may be applied with equal facility to the dash-board of an automobile, the locating of the device on the gear shift lever in place of the usual ball being for accessibility, convenience and safety.

A further feature of the invention resides in the ornamental appearance of my novel lighter. By varying the color of the transparent cover, these colors, when combined with the glow of the element or resistance unit as it is heated, will produce many varied and beautiful colors and shades, thus appealing to the aesthetic tastes of many drivers and operators. Thus my novel lighter, while useful in the extreme, is also an ornament, and an attractive addition to an automobile.

Further features and objects of the invention reside in the particular details of construction of my novel lighter, which will be hereinafter more fully described.

I believe that the cigar lighter above briefly described is novel, and have therefore claimed the same broadly in the present application.

I also believe that the combination of a lighter with the gear shift lever of an automobile, in place of the customary ball or knob, is novel, and have therefore claimed this combination in the present application.

The above and other features and objects of the invention, details of construction, combinations of parts, operation and advantages will be hereinafter more fully pointed out and claimed.

Referring to the drawings, illustrating a preferred embodiment of the invention, Fig. 1 is a side elevation of the upper end of a gear shift lever to which my novel lighter has been attached;

Fig. 2 is a central, vertical sectional view of the lighter in assembled position;

Fig. 6 is a cross-sectional view on the line 6—6 of Fig. 2;

Fig. 9 is a side elevation, on a reduced scale, illustrating the attachment of my novel lighter to the dash board of an automobile.

Figure 4:
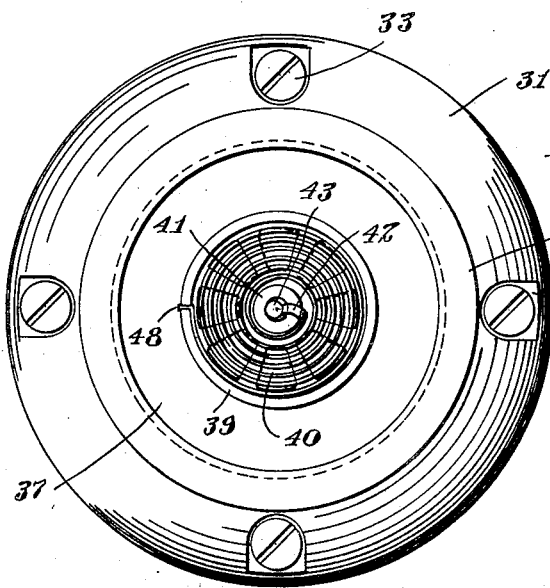
Fig. 4 is a bottom plan view of the removable portion of the lighter.

Referring now to the drawings, for a particular description of the invention, its construction, assembly and operation, I designates the gear shift lever of an automobile having the usual threaded upper end 2. Adapted to be threaded onto this end 2 is a member 3 having a frusto-conical lower end and provided with a shoulder 4. Molded around the reduced part of the member 3 is a core 5 of insulating material, threaded as clearly illustrated in Fig. 2, and having a flange 6 abutting against the shoulder 4. Threaded to the insulating core 5 is a member 7 to which an insulating disc 9 is attached by screws 10. After threading of the member 7 onto the threaded core 5, a recess 11 is drilled through said member 3, core 5 and member 7 and in said recess is fitted a sleeve 12 of insulating material. This drilling and fitting of the sleeve 12 will securely lock the threads on the core 5 and member 7.

Through this sleeve extends a suitably insulating current conducting wire 23, said wire being attached to any suitable source of power, such as the automobile battery, and being protected up to the sleeve 12 by suitable flexible armored conduit 13 attached to the gear shift lever 1 at predetermined intervals by clamps 14. The wire 23 passes through the disc 9 and is soldered to a small metallic disc 16 as at 15. A cup 17 of current conducting material is mounted on the disc 16, and the said cup, disc 16 and disc 9 are united by a rivet 18, the lower end of the rivet being seated in the recess 8 in the top of the member 3. The cup 17 preferably has a plurality of slots 19 around its periphery, to add desired flexibility to said cup.

The member 7 has an upstanding annular flange 20 provided with a groove 21 in which is fitted a spring ring 22 projecting, at intervals, beyond the periphery of the flange 20.

The structure thus far described, and fixed to the top of the gear shift lever 1, I designate as the fixed or stationary part of my lighter invention, although this fixed portion also includes my novel switch which will be hereinafter described.

The removable portion of my novel lighter comprises a semispherical cap or top of transparent material, such as glass, bakelite, or other suitable substance, although opaque material may be utilized if desired. This cap 25 may be of any desirable color, for ornamentation. The cap is provided with a central recess 26, stepped as illustrated at 27 to provide better diffusion and radiation of light therethrough. The cap 25 is provided with an annular groove 28, and within this groove are seated the sections 29 of a split ring, preferably of metal and spaced from the cap 25 by a washer 30 of cushioning material, such as felt. An annular member 31, having an upstanding arcuate flange 32 to conceal the split ring 29 is attached to the cap through the medium of said ring 29 by means of screws 33 abutting against shoulders 34 in the recesses 35 formed in the ring or member 31. Thus screwing of the ring 31 to the split ring 29 clamps a metallic disc 37 between the shoulder 36 of the ring 31 and the bottom of the cap 25, a washer 38 of cushioning material being interposed between the disc 37 and the bottom of said cap to avoid injury to said cap. Secured to the disc 37 by means of a hollow rivet 41 is a mounting 39 for the resistance wire or element 40, one end 42 of this element extending into the hollow of the rivet and being secured therein by a suitable plug or wedge 43. A disc 44 of insulating material is interposed between the element 40 and its mounting 39, and a disc 45 of insulating material is interposed between the mounting 39 and the metallic disc 37.

The disc or plate 37 is provided with apertures 46 and the mounting 39 is provided with apertures 47 in register therewith, and the insulating discs 44 and 45 are also preferably provided with apertures alined with said apertures 46 and 47. Thus when the circuit is completed and the element glows or is heated, the light therefrom will extend through the alined apertures 46 and 47 and be diffused through the transparent cap or cover 25, the insulating discs 44 and 45 being perforated and not interfering with the passage of the light. The outer end 48 of the resistance wire or element 40 extends through a slot in the side or flange of the mounting 39 and is held therein by the mounting being notched thereover, as illustrated at 49.

The bottom of the ring 31 is flat, as illustrated at 51, and is adapted to seat on the shoulder 50 of the member 7. Said ring 31 is provided with an inner annular rounded groove 52 into which the spring 22 is adapted to fit or spring when said ring 31 is in a predetermined position relative to the member 7. This predetermined position is such that the mounting 39 will be in positive contact with the cup 17, assuring positive passage of an electric current through said cup and mounting to the resistance unit or element 40.

As a switch for my novel lighter, I provide an annular sleeve 53 having a flange 54 at its upper end adapted to normally bear against the shoulder 58 of the member 7 by the tension of a coiled spring 55, the lower end of said spring seating on the flange 6 of the core 5. The lower end of this sleeve 53 is curved inwardly, as clearly shown in Fig. 2, which is preferable.

When the operator desires to light a cigar or cigarette, it is simply necessary for the operator to press slightly against the sleeve 53, at any point below the top thereof, which will effect a contact of the lower portion of said sleeve with the member 3, thus completing the circuit through the wire 23, disc 16, cup 17, mounting 39, resistance element 40, rivet 41, disc 37, ring 31, member 7, sleeve 53 and member 3. If desired an insulating disc may be substituted for the disc 37 and a conducting wire utiltized.

This will cause a heating of the resistance element 40 to a sufficient degree to permit a cigar to be lit therefrom. A touch anywhere on the sleeve 53 will effect this contact, as it has a universal capacity for contact. The degree of heat of the element 40 will be indicated to the operator by the light from said element passing through the apertures 46 and 47 and being diffused through the translucent cap 25. When the proper degree of heat has been reached, the operator grasps the removable portion and pulls it away from the fixed portion, the rounded groove 52 permitting ready removal of said removable portion. The element 40, which is normally faced away from the operator, is, when the operator brings the removable portion up toward a cigar or cigarette, faced toward said operator, in a convenient position, requiring no reversal of the element in the hand of the operator. The advantages of this feature are important and will appeal to the users of my novel lighter. After lighting the cigar or cigarette, the removable portion is readily replaced on the fixed portion and snapped over the spring ring 22, which will securely hold the removable portion in place until it is again desired to remove the same.

When the removable portion is on the fixed portion, a substantial sphere is presented, enabling easy manipulation of the gear shift lever in the accustomed manner.

When attached to the gear shift lever 1 the lighter will always be readily accessible to the hand of the operator, who will be able to reach the lighter, and operate the switch, without removing his eyes from the road. This is a feature of safety which will appeal to automobile drivers.

Figure 5:
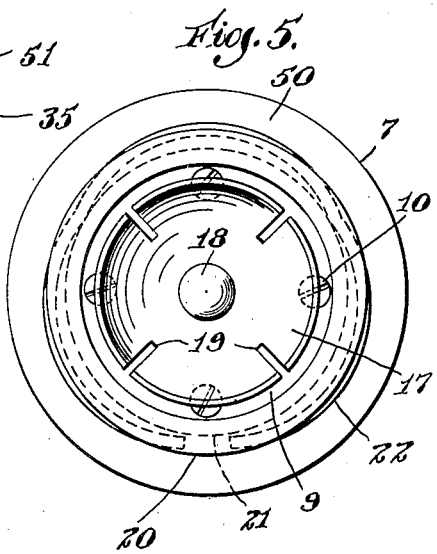
Fig. 5 is a top plan view of the fixed portion of the lighter.
Figure 3:
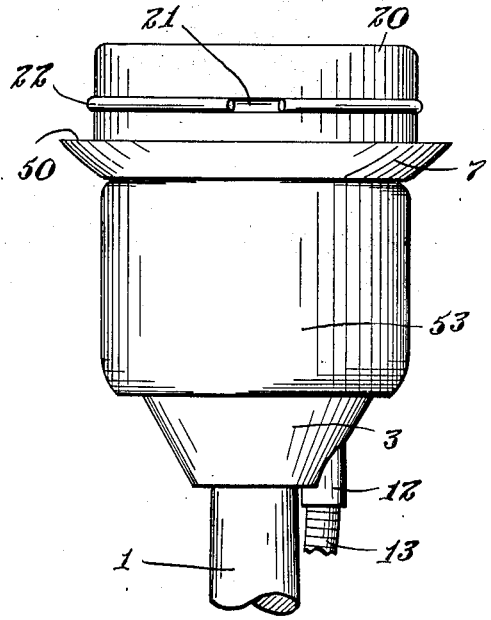
Fig. 3 is a side elevation of the fixed portion of the lighter.
Figure 7:
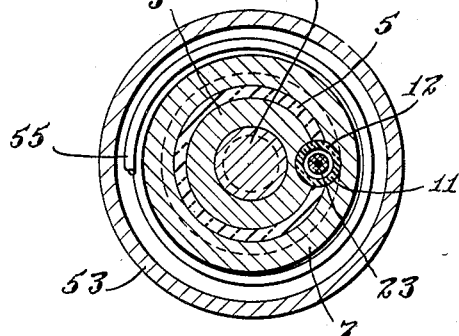
Fig. 7 is a cross-sectional view on the line 7—7 of Fig. 2.
Figure 8:
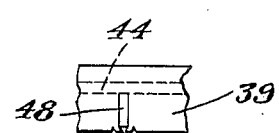
Fig. 8 is a fragmentary detail, on an enlarged scale, of the attachment of the lighting element to its mounting.

If desired, I may attach my novel lighter to the dash board of an automobile, as illustrated in Fig. 9, wherein the member 3 is provided with a reduced threaded portion or stem 60 adapted to pass through a suitable aperture in the dash 61, where the lighter is secured in position by a washer 62 and nut 63. Otherwise the structure of my novel lighter is identical with the lighter described in Figs. 1 to 8 inclusive.

It will thus be seen that I have devised a novel electric lighter, one containing many novel features and advantages, and which is an accessory combining both utility and ornamentation.

While I have necessarily described my invention somewhat in detail, it will be appreciated that I may vary the size, shape and arrangement of parts within reasonably wide limits without departing from the spirit of the invention.

My invention is further described and defined in the form of claims as follows:

1. A lighter of the kind described, comprising a fixed portion and a removable portion, a resistance element interposed between said portions and facing said fixed portion, and a sleeve surrounding a part of and mounted for universal movement on said fixed portion and manually engageable and operable to effect a contact with said fixed portion to energize said resistance element.

2. A lighter of the kind described, comprising a fixed portion and a removable portion, a resistance element interposed between said portions and facing said fixed portion, and a sleeve surrounding a part of and mounted for universal movement on said fixed portion and manually engageable and operable to effect a contact with said fixed portion to energize said resistance element, said sleeve being automatically returned to normal position.

3. A cigar-lighter comprising a holding device; an igniting unit mounted on the holding device for quick and complete removal for use; a heating element carried by the igniting unit; and means for conducting current to said heating element through said holding device including a switch mounted on the holding device and having an annular member surrounding the holding device and accessible for direct finger engagement to close the circuit leading to the heating element.

4. A cigar-lighter comprising a holding device having a boss-like projection; an igniting unit of knob-like form mounted on the holding device for quick and complete removal for use; a heating element carried by the igniting unit; and means for conducting current to said heating element through said holding device including a switch mounted on the holding device and having means surrounding the holding device for direct engagement with the fingers of the operator's hand when grasping the knob-like igniting unit to close the circuit leading to the heating element.

5. A cigar-lighter comprising a holding device; an igniting unit mounted on the holding device for quick and complete removal for use; a heating element carried by the igniting unit; a sleeve on the holding device; a sleeve on the igniting unit having sliding engagement with the sleeve on the holding device; and means for conducting current to said heating element through said holding device including a switch mounted on the holding device and having a sleeve coaxial with the sleeves on the igniting unit and the holding device ascessible for direct finger engagement to close the circuit leading to the heating element.

ALFRED F. JACKSON.